United States Patent Office 2,733,250
Patented Jan. 31, 1956

2,733,250

PREPARATION OF 2,5-DIARYLAMINO-3,6-DICHLOROQUINONES

Ben H. Kirby, Westfield, Walter J. Olenick, Linden, and Kenneth P. Smith, Elizabeth, N. J., assignors to General Aniline & Film Corporation, New York, N. Y., a corporation of Delaware No Drawing. Application May 22, 1952,
Serial No. 289,438

4 Claims. (Cl. 260—396)

This invention relates to an improved process for the preparation of 2.5-bis (monocyclic arylamino)-3.6-dichloro-1.4-benzoquinones.

2.5-dianilino-3.6-dichloro-1.4-benzoquinone is a valuable dyestuff intermediate. It was prepared heretofore by the reaction of chloranil (2.3.5.6-tetrachloro-1.4 benzoquinone) with excess aniline in boiling alcohol as a reaction medium (Annalen, vol. 114, page 307; vol. 210, page 187). This procedure is relatively expensive and inconvenient because of the necessity of recovering the excess aniline and alcohol from the reaction mixture.

More recently, it was found that 2.5-dianilino-3.6-dichloro-1.4-benzoquinone could be prepared by slurrying chloranil with two molecular equivalents of aniline in dilute aqueous caustic soda at temperatures of the order of 30 to 35° C. This process avoids the costly and inconvenient recovery of excess reagent and alcohol used as the reaction medium in the earlier procedures. The yield of the desired product, however, amounts only to 70 to 77 percent of theory.

In accordance with this invention, 2.5-bis-(monocyclic-arylamino)-3.6-dichloro-1.4-benzoquinones are produced in yields of the order of 90 per cent or more and as high as 97 per cent of theory, by slurrying chloranil with two molecular equivalents or a small excess (e. g., an excess up to about 10 per cent above the stoichiometric bi-molecular equivalent amount) of aniline or a nuclear substituted aniline in which the substituents are non-acidic and unreactive under the reaction conditions, in aqueous solutions of ammonia or a water-soluble tertiary alkylamine, at temperatures not substantially exceeding 50° C., particularly from 10 to 50° C., and preferably from 20 to 40° C. The quantity of ammonia or tertiary alkylamine is at least equal and preferably substantially exceeds the amount required to neutralize hydrogen chloride liberated in the formation of the 2.5-diarylamine-3.6-dichloro benzoquinone, the initial concentration of ammonia or tertiary alkylamine in the aqueous reaction medium being from 2 to 10 per cent. An excess up to about 10 times the amount theoretically required can be used.

By this procedure, 2.5 - dianilino - 3.6 - dichloro benzo - quinone is produced in yields of the order of 90 per cent or more of theory and often as high as 97 per cent of theory. Similarly high yields can be obtained upon replacing aniline with a nuclear substituted aniline in which the nuclear substituents are non-acidic and unreactive under the reaction conditions, to produce the correspondingly substituted 2.5-bis (monocyclic arylamino)-3.6-dichloro benzoquinone.

The nuclear substituted anilines which can be used in this process are those containing as nuclear substituents alkyl (e. g., methyl and ethyl) groups, alkoxy (e. g., methoxy and ethoxy) groups, or halogen (e. g., chlorine or bromine), and thus include the toluidines, xylidines, anisidines, phenetidines and chloro- and bromo-anilines.

Water-soluble tertiary amines which may replace the ammonia are, for example, trimethyl- or triethylamine, triethanolamine, methyl piperidine or methyl morpholine.

The reaction is facilitated or accelerated by inclusion in the aqueous slurry of a small amount (e. g., 0.05 to 1 per cent) of a dispersing agent such as sodium lignin sulfonate, the sodium sulfonate of formaldehyde naphthalene condensation products, alkyl benzene and alkyl naphthalene sulfonates, dioctyl sulfosuccinate and the like.

The products can be recovered merely by filtering the aqueous reaction mixture, and after washing with water until neutral are of satisfactory purity for direct use in the synthesis of dye-stuffs.

The following examples illustrate the procedures according to this invention wherein the parts and percentages are by weight:

Example I 47 parts (0.19 mol) of chloranil are added to 250 parts of water having dissolved therein 0.5 part of sodium lignin sulfonate, and the mixture is agitated until a uniform slurry is produced. 38.6 parts (0.41 mol) of aniline are added at a temperature below 30° C. and 200 parts of aqueous ammonia (containing 12 per cent $NH_3$) are then added while maintaining the temperature below 35° C. The temperature is then raised to 35 to 40° C. and the mixture agitated for 12 hours. The reaction product is then recovered by filtration, and the filter cake washed with water until neutral and dried. Analysis of the resulting product for chlorine and nitrogen yielded values substantially corresponding to theory for 2.5-dianilino-3.6-dichloro-1.4-benzoquinone. A yield of 66 to 68 parts is obtained, corresponding to 96.5 to 99 per cent of theory. The product can be employed directly for the preparation of sulphurized dyes of the type disclosed in German Patents 281,521, 282,501 to 282,503, and 288,823, such dyestuffs being of excellent quality and produced in excellent yields.

Increasing the amount of aqueous 12 per cent ammonia to 250 parts, and maintaining the temperature during the reaction at 30 to 40° C. in the foregoing procedure, results in a product of equally high quality and in similarly high yields.

Decreasing the amount of aqueous 12 per cent ammonia to 67 parts, provides an equally pure product but in a somewhat reduced yield of 62 to 63 parts, corresponding to 90.5 to 92 per cent of theory.

Reduction of the reaction period to 1 hour instead of 12 hours produces a yield of 62 to 64 parts, or 90.5 to 93.5 per cent of theory.

Upon reducing the reaction temperature to 10 to 15° C. a yield of 61 to 63 parts is obtained, corresponding to 89 to 92 per cent of theory.

Example II 47 parts of chloranil and 38.6 parts of aniline are agitated with 409 parts of water containing ½ part of sodium lignin sulfonate as described in Example I. 41.3 parts of triethylamine are added while maintaining the temperature below 35° C. The mixture is then heated to 37° C., and agitated for 8 hours at this temperature. The reaction product is isolated in the same manner as in Example I. 2.5-dianilino-3.6-dichloro-1.4-benzoquinone is obtained in a yield of 61 to 63 parts, corresponding to 89 to 92 per cent of theory.

For purposes of comparison, a series of 5 runs was carried out, substituting 12 per cent aqueous caustic soda for the aqueous ammonia in the procedure of Example I. In two of these runs, the amount of aniline was also increased by 20 and 33 per cent respectively. Yields in these experiments amounted to 70.2 to 77.5 per cent of theory, the procedure substantially corresponding in each case to that of Example I with the exception of the modifications noted above.

Results similar to those obtained in the procedure of

Example I can be produced by replacing the triethylamine with an equivalent amount of trimethylamine, triethanolamine, N-methyl piperidine, or N-ethyl morpholine.

Similar yields of substituted dianilino dichloro benzoquinones can be obtained by replacing aniline in the examples with equivalent amounts of para-toluidine, 2.4-xylidine, ortho- or para-anisidine, para-phenetidine, ortho-, meta- or para-chloro aniline and the like.

Other variations and modifications which will be obvious to those skilled in the art can be made in the procedure of this invention without departing from the spirit and scope thereof.

What we claim is:

1. In a process for the preparation of 2.5-bis-(mono-arylamino)-3.6-dichloro-1.4-benzoquinone by reaction of chloranil with a monocyclic aryl primary amine of the group consisting of aniline and nuclear substituted anilines in which the substituents are non-acidic and unreactive under the reaction conditions, the improvement which comprises slurrying said reagents in an aqueous solution of a nitrogen base of the group consisting of ammonia and water-soluble tertiary alkylamines having an initial concentration from 2 to 12 per cent and in an amount at least sufficient to react with all of the hydrogen chloride liberated by the formation of said diarylamino dichloro benzoquinone, at a temperature not substantially exceeding 50° C.

2. The process as defined in claim 1 in which the temperature is 10 to 50° C., and in which 2 to 2.2 mols of said monocyclic aryl primary amine are employed for each mol of chloranil.

3. A process as defined in claim 2 in which the arylamine and nitrogen base are respectively aniline and ammonia.

4. The process as defined in claim 2 in which the arylamine is aniline and the nitrogen base is triethylamine.

References Cited in the file of this patent

UNITED STATES PATENTS 2,229,099   Langbein _____ Jan. 21, 1941

OTHER REFERENCES

Annalen, vol. 114, page 307; vol. 210, page 187.
Jour. Am. Chem. Soc., vol. 56, pp. 691–93 (1934).
Chem. Abstracts 25: 3635 (1931).